United States Patent [19]

Bickling, Jr. et al.

[11] 3,874,862

[45] Apr. 1, 1975

[54] MOLD RELEASE COMPOSITION FOR MOLTEN GLASS AND METHOD OF APPLICATION

[75] Inventors: Archie L. Bickling, Jr.; Richard E. Brown; Kent G. Roller; Thomas J. Loran, all of Boulder, Colo.

[73] Assignee: Ball Brothers Research Corporation, Boulder, Colo.

[22] Filed: Dec. 13, 1973

[21] Appl. No.: 424,260

[52] U.S. Cl............ 65/26, 65/169, 252/22, 252/29
[51] Int. Cl............................................. C03b 39/00
[58] Field of Search............ 65/24, 26, 169; 252/22, 252/29

[56] References Cited

UNITED STATES PATENTS

| 3,278,429 | 10/1966 | Agnew et al. | 252/29 X |
| 3,495,962 | 2/1970 | Norton et al. | 65/26 |

*Primary Examiner*—Arthur D. Kellogg
*Attorney, Agent, or Firm*—Gilbert E. Alberding

[57] ABSTRACT

A composition and method is herein described for mold release and parting operations. The novel composition comprises a dispersion of a mixture of a solid lubricant, such as graphite or carbon, a carrier, a binder, and a s-triazinyl derivative. A preferred composition comprises graphite, aqueous carrier, sodium silicate and ammeline.

27 Claims, No Drawings

MOLD RELEASE COMPOSITION FOR MOLTEN GLASS AND METHOD OF APPLICATION

BACKGROUND OF THE INVENTION

1. Field of the Invention

The present invention relates to novel compositions of matter and methods of using said compositions. More particularly, it relates to compositions of matter useful as mold release and parting agents for protecting and lubricating the surfaces of molds, plungers, and other article-forming parts, especially such as are useful in the manufacture, forming, and handling of glass articles or the like at high temperatures.

2. Description of the Prior Art

In glass manufacturing, a glob of molten glass is formed by a blank mold into a parison having a finished portion corresponding to the neck portion of the desired glass article. It is a requirement that the molding surface of the blank mold not become abraded or pitted so that the molten glass will readily flow over the molding surface of the mold, take the shape thereof, and then separate therefrom. Protection and lubrication are therefore required. It is known that the glob of molten glass delivered to a glass forming machine has an average surface temperature of about 1600° to 1700°F. Thereafter, during the final process of shaping and forming process, the molten glass has cooled to a temperature between about 1250° and 1350°F. As can be appreciated this cooling process renders the glass less plastic and often creates a dragging or abrasive effect upon the molding surface of the equipment.

Several practices have been followed in the past for the protection and lubrication of such molds used in forming glass articles. Typically, it has been the practice to apply to such molds various compositions or dopes containing a graphite compound or the like suspended in a carrier. Often hydrocarbons of some type, such as kerosene have been used. Generally these compositions are applied by spraying, painting or swabbing during the forming operations so as to provide lubrication of the interacting mold sections and to prevent sticking of the molten glass to the mold surfaces. It will be appreciated that there are some drawbacks in such compositions containing hydrocarbons as well as their method of application. Since the glass molds are at an elevated temperature, the hydrocarbon materials are quickly driven off into the atmosphere. Aside from the obnoxious odors, the vaporized materials create considerable volumes of smoke which reduce visibility, and produce upon condensation serious fire hazards which oftentimes becomes progressively worse as the accumulation increases. Further, the application of the composition to various moving parts of the machine in actual production must be regularly repeated a number of times on a regular basis which could result in injury to the operators. Needless to say, these disadvantages have required that the industry employ other solutions to circumvent these undesirable conditions. Further discussion of the long-existing problems with such compositions and efforts to avoid these problems can be found in U.S. Pat. Nos. 3,141,752; 3,480,422; 3,508,893; 3,523,016 and 3,623,856.

A number of aqueous systems have been employed with various degrees of success. Various mixtures and compositions having organic or inorganic binders have been used for coating molds for their protection in which water is used as a carrier. Illustrative of these aqueous formulations containing an inorganic binder is U.S. Pat. No. 1,568,234 which discloses a coating composition for protecting molds, the composition consisting of an inert refractory material such as clay, lampblack and a soluble silicate. Further, U.S. Pat. No. 2,988,454 discloses a composition of matter for use as a coating or parting agent for the protection of surfaces of molds used in the formation of glass articles, the composition consisting of a mixture of an alkali metal silicate solution, crystal urea and colloidal graphite. U.S. Pat. No. 2,618,530 discloses a mold coating composition containing graphite, a metal borophosphate as a binder in a liquid carrier such as water. As an example of a composition having an organic binder in which water is used as a carrier, U.S. Pat. No. 3,042,541 discloses an aqueous dispersion composition comprising a carbohydrate, an acidic material, and a resin including a melamine-formaldehyde condensation products.

SUMMARY OF THE INVENTION

After investigation, it has been found compositions of matter which are thought advantageous in several respects over prior art compositions, particularly in their capacity to hold up under long periods of time and under a wide range of severe commercial operations.

Accordingly, one aspect of the present invention provides effective compositions of matter suitable for coating molds used in casting or forming materials at high temperatures without emitting organic pollutants to the atmosphere.

A further aspect of the subject invention provides a parting and lubrication system which significantly minimizes periodic swabbing or treatment of the molds during production.

From another aspect the present invention provides an improved parting and lubrication system which improves the pack of glassware formed.

Still another aspect of the present invention is to provide a parting and lubricating system for glassware molds which may be conveniently applied away from and prior to the production process.

Yet still another aspect of the present invention is to provide a lubrication system for glassware molds which produces a substantially more uniform glass article, especially along the inside walls thereof.

These and other aspects and features of the present invention will become apparent from the following description.

DETAILED DESCRIPTION OF THE INVENTION

According to the present invention, molds or molding surfaces are treated with a release and lubricating composition comprising a dispersion of a mixture of graphite, a carrier, a binder, and a heterocyclic compound represented by the structural formula:

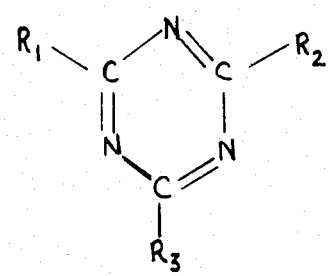

wherein R1, R2 and R3 are independently selected from the group consisting of hydrogen, hydroxyl, hydroxyalkyl having 1 to 6 carbon atoms, alkoxy having 1 to 3 carbon atoms, amine, and hydroxyamino.

Representative heterocyclic compounds include:

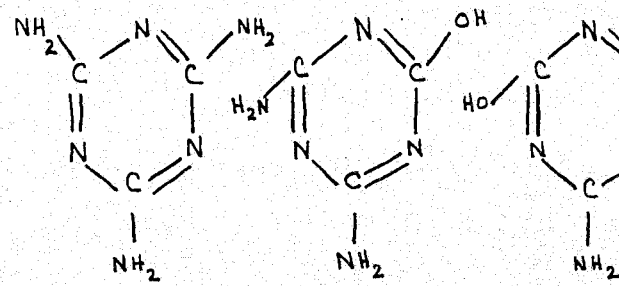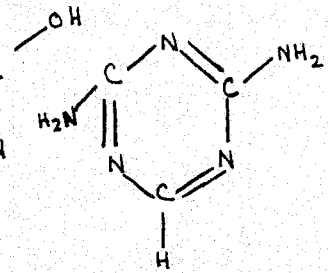

In its broad aspects the composition may be comprised of 2 to 80 parts by weight of graphite, 25 to 90 parts of a carrier, 15 to 80 parts by weight of the binder, and from 1 to 30 parts by weight of the aforementioned heterocyclic compound. A preferred embodiment comprises a composition having about 26 parts by weight graphite, about 19 parts sodium silicate having a 42° Baume, about 3 parts zinc oxide, about 48 parts water, and about 4 parts ammeline.

The solid lubricant described herein is a carbon-containing compound, e.g., graphite or carbon. The graphite or carbon used in the subject invention may be any of various carbon blacks, flake and colloidal graphite or conventional graphite known to the trade. Further, it is understood that either natural or synthetic forms of graphite can be satisfactorily employed in accordance with the present invention. The carbon or graphite may be of technical or spectro grade which may be ball milled, if need be, to reduce particle size. The milling may be done to achieve about a zero grind. While particle size is not critical, particles ranging from between about 10 to 200 microns are useful, and preferrably particle sizes less than about 75 microns should be employed to produce a desirable smooth coating. Generally, from about 2 to about 80 parts by weight of the mixture may comprise graphite. A preferred range is from 25 to about 30 parts by weight.

The binders of the subject invention include both the organic and inorganic binders. Generally, the organic binders include those plastic and resin binders which have thermal stability and possess relatively sufficient oxidation resistance as an inherent characteristic to allow their use at high operating temperatures. Organic binders include polybenamidazole, polyimide, polyphenylene-sulfide, organosilicon polymers and the like. A preferred binder is polyimide, especially the aromatic polyimide having a repeating group:

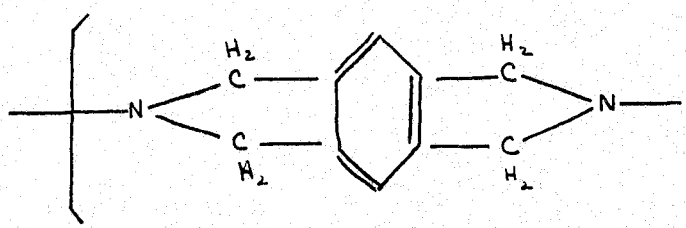

wherein R is an aromatic group, and preferably:

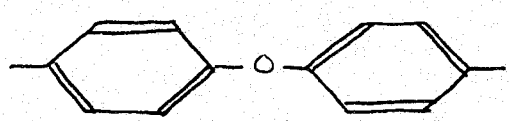

Since fine binder particles or precursors undergo cross-linking or polymerization during the heat curing period, exact molecular weight is not a particularly critical aspect of the polyimide. It may be assumed that, after curing, the polyimide cross-links into a very high molecular weight composition.

To facilitate application of the composition, a carrier or vehicle system of organic solvent or solvents for polyimide is utilized. While not critical, operable solvents include N-methylpyrrolidone, mixtures of N-methylpyrrolidone, xylene and other aromatic solvents, ethanol, isopropanol, butanol and ethylene glycol. Since the carrier system is essentially a passive aspect as regards the binder, it will be recognized that combinations and permutations of solvents are almost unlimited.

Generally, the inorganic binders include the silicates. The silicates used in the process and compositions of this invention are those silicates generally of inorganic bases. Exemplary of such silicates are sodium silicate, potassium silicate, and lithium silicate. Also, the organic silicates may be satisfactorily employed and include guanidine silicate, tetramethylammonium, and tetraethanolammonium silicate. The preferred silicate is sodium silicate. These silicates are readily available from commercial sources and include solutions of sodium silicate having molar ratios of $SiO_2$ to $Na_2O$ from 1:1, in the case of sodium metasilicate to as high as below about 3.9:1. All such commercially available silicates are suitable as starting materials for the process and compositions of this invention. Generally, the amount of silicates incorporated in the instant formulations may vary over wide ranges.

When silicates are employed as binders, it is generally necessary to include a metal oxide. The metal oxides employed in accordance with this invention include zinc oxide, lead oxide and antimony trioxide. The preferred oxide is zinc oxide. Although the metal oxides seemingly function as curing agents for the sodium silicate they apparently also function as buffers to allow water of crystallization to gradually leave the system upon drying or removal of the carrier. In this regard, it is understood that the metal oxides herein described enhance the silicate-containing compositions of this invention although it is only hypothesized as to their specific functional characteristics. The amount of these metallic oxides may range from 0.5 to about 5 parts by weight of the total composition.

In treating molds and mold parts with these compositions their application and subsequent drying may be carried out in a straightforward manner. Simply, the treatment of a mold or mold part consists in contacting it with the dispersion of the type defined above, subsequently allowing the carrier to evaporate, generally with a final heating or baking.

In carrying out the process of this invention, it is generally desirable to clean the surface of the glass forming equipment beforehand to remove all contamination such as metal oxides, loose particles, oil, dirt, and the like to assure a better adhesion and longer life of the coating.

The dispersions or mixtures of the subject invention may be applied to the mold or mold part by any of the conventional means such as brushing, spraying, dipping, or blowing onto the surface. Spraying is preferred.

The carrier may be removed by any number of conventional means. After a uniform and smooth, thin coating is produced on the metal surface, the mold is preferrably gently heated or baked at a low temperature to remove the carrier and thereafter at an elevated temperature to remove any remaining carrier or other volatile constituents and to set or fix the binder. It is worth mentioning that air drying may be used with aqueous carriers in conjunction with silicates.

The amount of binder utilized in accordance with this invention is that sufficient to bind the particles of graphite so that they are bonded to each other and to the substrate. Subjecting the coating to temperatures between about 100°F., to about 300°F., generally for a period of 30 minutes to 1 hour serves to adequately remove the carrier during the initial period. Thereafter, heating at a slightly increased temperature, that is between about 300° to about 700°F., for a period of about several minutes to about 2 hours serves to set the binder and remove traces of any volatile constituents. Since glassware molds often must be preheated to an elevated temperature prior to installation and use of glassware-producing machines, it is convenient to utilize the preheating period for the higher baking period.

After setting the binder, the composition adheres tenaciously to the mold in a thin, uniform coating of binder and graphite along with the heterocyclic compound uniformly dispersed therein. Although the coating is generally of microscopic thickness, coating thicknesses may vary considerably between 0.00025 and 0.03 inches, but preferrably are held toward the thinner portion of this range, an optimum being 0.0005 and 0.004 inches. The coating is thermally stable, oxidation resistant and transfers heat quite well. As regards lubricity, it has been demonstrated that the composition of the subject invention renders high temperature lubricity to a given surface, that is, lubricity is particularly noted at temperatures from between about 600° to 1000°F.

Wetting agents may be readily employed to facilitate dispersion of any of the water-insoluble ingredients and to stabilize the resulting dispersion. Thickening agents and the like may also be employed to achieve a desired fluidity, and pigments or fillers such as talc may be included, if desired, in order to facilitate complete covering of the desired mold surface by making the coating readily visible to the operator as it is applied.

Also, additive constituents which may be advantageously, but optionally, included are compounds to improve oxidation resistance of the composition, thermal stability and/or conductivity of the composition and wear resistance of said composition. Useful additives include barium fluoride, silicon fluoride and calcium fluoride.

While the baking operation serves to drive off any volatiles such as water or solvent carriers, it also appears to fix or stabilize the carbon or graphite particles upon the surface of the mold with the result that a firmly adherent coating is produced. Again, because of the firm adherance and durability of the coating obtained in the foregoing manner, it may be said to be intregally bonded to the mold as compared to the many superficial mold coatings of the prior art.

The result obtained through use of the aforedescribed compositions demonstrates that the ordinary operational life on conventional machines is many times greater than the operational life of other coatings. Further, by the compositions herein disclosed and claimed there is produced great savings in time and cost, since it is now possible to run glass-forming and handling equipment for considerably longer periods of operating time, as well as eliminate the necessity of hand swabbing the molding equipment.

Although the present formulation, and methods deal especially with glass-molds, it will be appreciated that such compositions are also very useful for other molds when parting and lubrication are necessary. Thus, the herein described compositions may be useful for metal forming industry such as for zinc, aluminum, etc. Also, said compositions may be useful for molds for forming elastomers, rubber articles, plastics, etc.

The following Examples are offered to illustrate the invention in greater detail.

EXAMPLE I

A conventional cast iron blank mold employed in molding bottles from molten glass initially cleaned by preheating to about 600°F., to remove any residual organic materials, such as oils, etc. The surface of the blank mold was then lightly sandblasted to remove any residual scale, rust, or other foreign materials therefrom.

A coating material was prepared by mixing 26.07 parts graphite having a 200 mesh or finer grit size, 2.90 parts powdered zinc oxide, 4.14 parts of ammeline, 18.62 parts sodium silicate having an $SiO_2/Na_2O$ ratio of 2.40, said sodium silicate being a 42° Baume solution, and 48.27 parts water. About 350 mls., of this material was introduced into a 1000 mls., capacity vessel and ball milled for about 3 hours. The mixture was determined to have a zero grind, and was free from lumps or large particles by spreading a 3 mil wet coating on a cardboard surface and inspecting for particle size uniformity under 35 × magnification. The viscosity of the mixture was 15 Zahn second in a No. 5 Zahn viscometer.

The mixture was sprayed by a spray gun over the complete sandblasted surface of the mold. The spray mold was cured for 45 minutes at 450°F., in an air circulating oven. The treated mold was removed and preheated to about 675°F., in an open flame preheater prior to installation in to a conventional glass forming machine. The thickness of the mixture after spraying and allowing to air dry was determined to be about 2 mils.

The blank mold treated in accordance with this example was used to produce a standard 8 oz., bottle without additional swabbing. The coated mold formed over 1200 bottles and performed satisfactory for more than 24 hours with no supplementary lubrication. It was noticed that bottles produced by the use of this mold mix in comparison with a standard petroleum-graphite mold lubricant produced a more uniform bottle, especially along the inside walls thereof.

EXAMPLE II

Another blank mold, similar to the one employed in Example I, was coated following the same procedure used in the foregoing example, with the exception that the spray mixture contained 23.5 parts by weight of graphite, 4.5 parts by weight zinc oxide, 2.5 parts by weight ammeline, 34.75 parts by weight sodium silicate of a ''° Baume solution, and 34.75 parts by weight water. Again, this mix was monitored for particle size and consistency as in Example I.

The mix was sprayed by means of a gun sprayer on the molding surface of the blank molds in thicknesses varying from 2 mils to 3.5 mils after air drying. The molds were placed in an oven at 180°F., for 1 hour and the temperature was thereafter programmed at 50°F., per 15 minutes until 500°F., was reached whereafter the treated mold surfaces were cooled to room temperature.

The treated molds were preheated in a gas fired oven and installed into an individual section machine set up to make a variety of bottles having various configurations and capacities ranging from 8 oz., to 40 oz. The coated molds performed very satisfactory from about 18 hours to more than 20 hours.

While the subject invention is described in detail in several embodiments which this invention may assume in practice, it will be appreciated to those skilled in the art that there is changes and modifications may be made without departing from this invention, the scope of which is defined in the following claims.

We claim:

1. A release and lubricating composition comprising a dispersion of a mixture of a solid lubricant, a carrier, a binder, and a s-triazinyl derivative.

2. A release and lubricating composition as recited in claim 1 wherein the s-triazinyl derivative is represented by the formula:

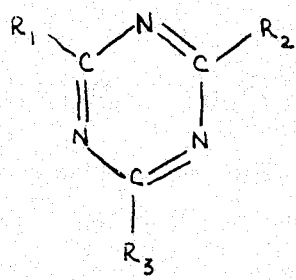

wherein R1, R2, and R3 are independently selected from the group consisting of hydrogen, hydroxyl, hydroxyalkyl having 1 to 6 carbon atoms, alkoxy having 1 to 3 carbon atoms, amine and hydroxylamino.

3. A release and lubricating composition as recited in claim 1 wherein the s-triazinyl derivative is a member selected from the group consisting of 4,6-diamino-s-triazin-2-ol; 2,4,6-triamino-s-triazin, and 4-amino-s-triazin-2,6-diol.

4. A release and lubricating composition as recited in claim 1 wherein the binder is a silicate and the solid lubricant is graphite.

5. A release and lubricating composition comprising a dispersion of a mixture of graphite, a carrier, a binder selected from the group consisting of silicates, polyimides, polyarylene sulfides, polybenzimidazoles, and organosilicone polymers, and a s-triazinyl derivative represented by the formula:

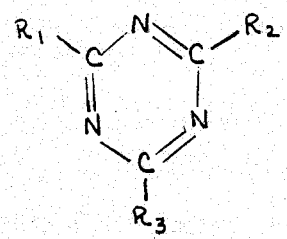

wherein R1, R2, and R3 are independently selected from the group consisting of hydrogen, hydroxyl, hydroxyalkyl having 1 to 6 carbon atoms, alkoxy having 1 to 3 carbon atoms, amine and hydroxylamino.

6. A release and lubricating composition as recited in claim 5 wherein the s-triazinyl derivative is a member selected from the group consisting of 2,4,6-triamino-s-triazin; 4,6-diamino-s-triazin-2-ol and 4-amino-s-triazin-2,6-diol.

7. A release and lubricating composition as recited in claim 5 wherein the binder is an alkali metal silicate.

8. A release and lubricating composition as recited in claim 7 wherein the alkali metal silicate is sodium silicate.

9. A release and lubricating composition as recited in claim 8 wherein the sodium silicate includes a metal oxide.

10. A release and lubricating composition comprising an aqueous dispersion of a mixture of graphite, an aqueous carrier, an alkali metal silicate, a metal oxide, and s-triazinyl derivative selected from the group consisting of 2,4,6-triamino-s-triazin; 4,6-diamino-s-triazin-2-ol, and 4-amino-s-triazin-2,6-diol.

11. A release and lubricating composition as recited in claim 10 wherein the metal oxide is zinc oxide.

12. A release and lubricating composition as recited in claim 10 wherein the alkali metal silicate is sodium silicate.

13. A release and lubricating composition comprising a dispersion of a mixture of from about 2 to about 80 parts by weight of graphite, a carrier, 15 to about 80 parts by weight of a binder selected from the group consisting of silicates, polyimides, polyarylene sulfides, polybenzimidazoles, and organosilicone polymers, and about 1 to about 30 parts by weight of a heterocyclic compound represented by the formula:

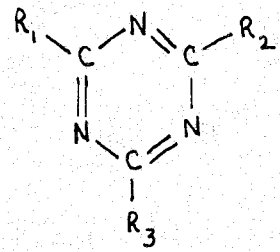

wherein R1, R2 and R3 are independently selected from the group consisting of hydrogen, hydroxyl, hydroxyalkyl having 1 to 6 carbon atoms, alkoxy having 1 to 3 carbon atoms amine and hydroxylamino.

14. A release and lubricating composition as recited in claim 13 wherein the binder is between about 20 to 40 parts by weight.

15. A release and lubricating composition as recited in claim 14 wherein the heterocyclic compound is a member selected from the group consisting of 2,4,6-triamino-s-triazin; 4,6-diamino-s-triazin-2,6-diol and is present between about 1 and 30 parts by weight.

16. A method of forming a lubricating and release coating on surfaces of molds and related parts, comprising applying a dispersion of a mixture of a solid lubricant, a carrier, a binder, and a s-triazinyl derivative to the surface and part to be coated and heating the surface and the dispersion to evaporate the carrier to form a thin coating thereon.

17. A method of forming a lubricating and release coating on surfaces of molds and related parts as recited in claim 16 wherein the s-triazinyl derivative is represented by the general formula:

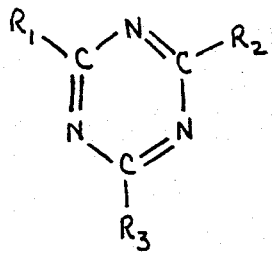

wherein R1, R2 and R3 are independently selected from the group consisting of hydrogen, hydroxyl, hydroxyalkyl having 1 to 6 carbon atoms, alkoxy having 1 to 3 carbon atoms, amine and hydroxylamino.

18. A method of forming a lubricating and release coating on surfaces of molds and related parts, comprising applying a dispersion of a mixture of a solid lubricant, an aqueous carrier, a binder, comprising a alkali metal silicate, and a s-triazinyl derivative to the surface and part to be coated, and s-triazinyl derivative being a member selected from the group consisting of 2,4,6-triamino-s-triazin; 4-6-diamino-s-triazin; 2,6-diol, and heating the surface and the dispersion to evaporate the carrier to form a thin coating thereon.

19. A method as recited in claim 18 wherein the lubricant is graphite and the binder includes a metal oxide.

20. A method as recited in claim 17 wherein after the surfaces are coated an additional coating of dispersion is periodically applied.

21. A method of molding a glass article, comprising treating the surfaces of a mold and related parts that come in contact with a hot glass body with a composition comprising a dispersion of a mixture of a solid lubricant, a carrier, a binder, and a s-triazinyl derivative; heating the surfaces and dispersion to evaporate the carrier to form a coating on said surfaces; contacting the coated surfaces with the hot glass body and shaping said body to a final form whereby a uniform heat transfer is effected yielding an article having a uniform wall thickness.

22. A method of molding a glass article as recited in claim 21 wherein the s-triazinyl derivative is a member selected from the group consisting of 2,4,6-triamino-s-triazin; 4,6-diamino-s-triazin-2-ol, and 4-amino-s-triazin-2-6-diol.

23. A method as recited in claim 21 wherein the binder is an alkali metal silicate.

24. A method as recited in claim 23 wherein the alkali metal silicate is sodium silicate.

25. A method as recited in claim 24 wherein the binder includes a metal oxide.

26. A method as recited in claim 21 wherein after the surfaces of the molds and related parts are coated an additional coating of dispersion is periodically applied.

27. A treated metal surface comprisiing a molding surface having securely adhered thereto a coating comprising a said lubricant and a s-triazinyl derivative dispersed through a mixture of binder, said coating being of a thickness between 0.000025 and 0.03 inches.

* * * * *